United States Patent [19]

Haseba

[11] 3,872,213

[45] Mar. 18, 1975

[54] METHOD FOR REMOVING HARMFUL COMPONENTS FROM EXHAUST GASES

[75] Inventor: Shigeru Haseba, Kobe, Japan

[73] Assignee: Kobe Steel Ltd., Kobe, Japan

[22] Filed: Aug. 30, 1972

[21] Appl. No.: 285,104

[30] Foreign Application Priority Data
Aug. 30, 1971  Japan.............................. 46-066784

[52] U.S. Cl................... 423/213.7, 60/274, 60/301
[51] Int. Cl............................................. B01d 53/00
[58] Field of Search...... 423/212, 213, 214; 60/301, 60/274

[56] References Cited
UNITED STATES PATENTS

| | | | |
|---|---|---|---|
| 1,902,160 | 3/1933 | Frazer et al......................... | 423/213 |
| 3,476,508 | 11/1969 | Kearby et al....................... | 423/213 |
| 3,581,490 | 6/1971 | Morris................................. | 60/301 |
| 3,599,427 | 8/1969 | Jones.............................. | 423/212 X |
| 3,701,823 | 10/1972 | Hardison............................. | 423/213 |

Primary Examiner—G. O. Peters
Attorney, Agent, or Firm—Oblon, Fisher, Spivak, McClelland & Maier

[57] ABSTRACT

The present invention is concerned with a new method for removing harmful components such as nitrogen oxides, hydrocarbons and carbon monoxide from exhaust gases, especially automobile exhaust gases, by passing the exhaust gases entrained with oxygen through a catalyst bed which selectively oxidizes hydrogen, then passing the treated gases through a catalyst bed which selectively reduces the nitrogen oxides in the gases, and finally passing the gases into a catalyst bed which oxidizes the carbon monoxide and hydrocarbons in the gases.

7 Claims, 1 Drawing Figure

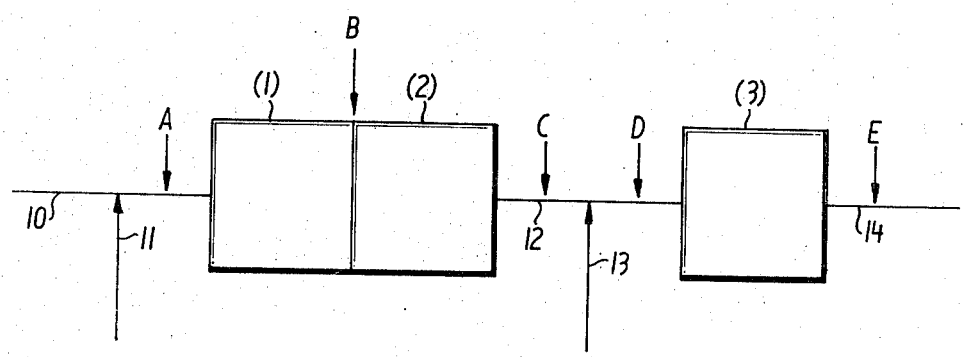

METHOD FOR REMOVING HARMFUL COMPONENTS FROM EXHAUST GASES

BACKGROUND OF THE INVENTION

1. Field of the Invention

This invention relates to a method for eliminating harmful and extraneous components present in the exhaust gases evolved from the combustion of hydrocarbon materials. In particular, the invention is concerned with the elimination of gaseous components from the exhaust gases evolved from automobiles.

2. Description of the Prior Art

It is a well known procedure to those skilled in the art to pass exhaust gases through a nitrogen oxide reducing catalyst bed and then through a carbon monoxide and hydrocarbon oxidizing catalyst bed. As the gases pass into the oxidizing catalyst bed, the bed is supplied with oxygen or air. In this method, carbon monoxide and hydrocarbons are successfully converted into harmless components such as carbon dioxide and water, but it is difficult to convert the nitrogen oxides into harmless nitrogen gas.

It was recognized that a portion of the nitrogen oxides (30 – 60%) in the exhaust gases reacts with the hydrogen (1 – 3%) present in the exhaust gas and is converted to ammonia while the other portion of the nitrogen oxides (70 – 40%) is reduced to nitrogen gas. As the gases pass into the oxidizing catalyst bed to oxidize carbon monoxide and hydrocarbons, the ammonia is oxidized back to the nitrogen oxides. Thus, the nitrogen oxides are only partially removed from the exhaust gases because of the observation noted above. The present invention is an attempt to overcome the disadvantages of the conventional method.

SUMMARY OF THE INVENTION

Accordingly, one object of the invention is to provide a new pretreatment of exhaust gases before they are passed through the catalyst beds, which remove harmful gaseous components, to avoid the production of ammonia.

Another object of the invention is to provide an effective way to heat the nitrogen reducing catalyst beds to high temperatures.

Yet another object of the invention is to remove the harmful gaseous components effectively and easily.

Briefly, these and other objects of this invention are achieved by introducing the exhaust gases entrained with an oxygen containing gas into an oxidizing catalyst bed which oxidizes hydrogen in the exhaust gases, introducing the gases passed through the hydrogen oxidizing catalyst bed into a reducing catalyst bed which reduces the nitrogen oxides in the gases, and introducing the gases passed through the reducing catalyst bed into a second oxidizing catalyst bed which oxidizes the carbon monoxide and hydrocarbons in the gases.

BRIEF DESCRIPTION OF THE DRAWING

FIG. 1 is a flow diagram of the exhaust gas treating system showing the orderly progression of the hydrogen oxidizing catalyst bed (1), the nitrogen oxide reducing catalyst bed (2) and the carbon monoxide and hydrocarbon oxidizing catalyst bed (3).

DETAILED DESCRIPTION OF PREFERRED EMBODIMENTS

Besides the advantages offered by the process of this invention, which will become more evident later, an additional advantage is realized by the addition of an oxygen containing gas to the exhaust gases exiting the reactor containing the nitrogen oxide reducing catalyst prior to charging the exhaust gases into the reactor containing the carbon monoxide and hydrocarbon oxidizing catalyst. Another process advantage is achieved by the transfer of heat generated by the oxidation of hydrogen to water to the reactor containing the nitrogen oxide reducing catalyst.

In the process, better results than expected are obtained by using a hydrogen oxidizing catalyst which removes hydrogen over a broad temperature range such as 50° – 300°C., but does not at the same time remove the nitrogen oxides in the indicated temperature range. A suitable hydrogen oxidizing catalyst includes a supported platinum catalyst. Improvements in the process are also achieved when the catalytic materials used for the oxidation of hydrogen are substantially the same as those used for the reduction of the nitrogen oxides. For the most effective operation, hydrogen is oxidized over a catalyst in the temperature range of 50° – 300°C. while the nitrogen oxides are reduced at a temperature over 300°C. Suitable nitrogen oxide reducing catalysts include supported palladium, nickel and/or copper chromite catalysts. Suitable carbon monoxide and hydrocarbon oxidizing catalysts include supported platinum, palladium, nickel and copper chromite catalysts.

The quantity of oxygen or oxygen containing gas added to the exhaust gases is more than that needed to oxidize the hydrogen present in the exhaust gases, but less than half the total quantity of oxygen needed to oxidize both the hydrogen and carbon monoxide in the exhaust gases. If necessary, the oxygen or oxygen containing gas may be heated prior to addition to the exhaust gases. This is dependent upon the characteristics of the particular catalyst used. In the instances where oxygen or oxygen containing gases are entrained in the gases issuing from the nitrogen oxide reducing reactor, the quantity of oxygen used is more than that required to oxidize the carbon monoxide and hydrocarbons in the gases.

In the overall process, the exhaust gases mixed with oxygen or an oxygen containing gas is passed into the hydrogen oxidizing catalyst bed wherein hydrogen is removed and a portion of the carbon monoxide (40 – 70%) is converted into carbon dioxide. The gases issuing from the hydrogen oxidizing catalyst bed are heated to 300°–800°C. and introduced into the nitrogen oxide reducing catalyst bed, wherein the nitrogen oxides and carbon monoxide are converted into nitrogen and carbon dioxide. Only a minor portion, less than 10%, of the nitrogen oxides are converted into ammonia in this treatment. The quantity of the ammonia produced is very small compared with the quantities produced in conventional methods. The gases treated in the nitrogen oxide catalyst bed are heated to 100° – 700°C. and introduced into the carbon monoxide and hydrocarbon oxidizing catalyst bed, wherein any remaining hydrocarbons and carbon monoxide in the gases are converted into carbon dioxide and water. Though a portion of the ammonia produced in the nitrogen oxide reducing catalyst bed is converted again into nitrogen oxides in the carbon monoxide and hydrocarbons oxidizing catalyst bed, the quantity of nitrogen oxides produced is extremely small.

As is well known, the reaction conducted in the hydrogen oxidizing catalyst bed generates heat. The temperature in the nitrogen oxide reducing catalyst bed is usually maintained at temperatures greater than 350°C. Therefore, the heat generated in the hydrogen oxidizing catalyst bed can be utilized as the heat source for the nitrogen oxide reducing reactions since both the hydrogen oxidizing catalyst bed and the nitrogen oxide reducing catalyst bed are contained in a vessel that may or may not have a partition to divide the catalyst beds.

The process of this invention is primarily concerned with the treatment of automobile exhaust gas. However, this invention can be applied to the exhaust gases from general chemical plants or boiler systems.

Having generally described the invention, a further understanding can be obtained by reference to certain specific Examples which are provided herein for purposes of illustration only and are not intended to be limiting in any manner.

EXAMPLE 1

A. The following catalyst systems are used in the appropriate reactors.

Catalyst (1)

A 0.2 wt. % quantity of platinum on alumina pellets is used as the hydrogen oxidizing catalyst. This platinum catalyst is formed according to general methods well known in the art.

Catalyst (2)

A 0.2 – 0.5 wt. % quantity of palladium on alumina pellets is used as the nitrogen oxide reducing catalyst. This palladium catalyst is also formed according to general methods well known in the art.

Catalyst (3)

Any one of several commercial catalysts useful in the treatment of automobile exhaust gases may be used as the carbon monoxide and hydrocarbon treating catalysts.

B. Apparatus

The apparatus employed is shown in FIG. 1.

A 0.5 – 1.0 l quantity of catalyst (1) was packed into reactor (1), 0.5 – 1.0 l of catalyst (2) in reactor (2) and 1 – 2 l of catalyst (3) in reactor (3).

Reactors (1) and (2) were divided by a wire netting or a similar device.

Procedure (Refer to FIG. 1.)

An exhaust gas is introduced into the system through pipe 10 and air is introduced into the system through pipe 11. This gas mixture is fed into reactor (1) and then to reactor (2). After treatment of the gas in reactors (1) and (2), the gas mixture is introduced into reactor (3) through pipe 12. Air is added to the gas mixture between reactors (2) and (3) through pipe 13. The gas mixture issuing from reactor (3) passes through pipe 14 to the atmosphere. The temperatures of gas mixtures are measured at the inlets of reactors (1), (2) and (3). The components and the total gas quantity are measured at points A, B, C, D and E. The total gas quantity is measured by a dry gas meter while the components: $CO$, $CO_2$, hydrocarbon, $NO$ and $NO_2$ are analyzed by a continuous infrared or ultraviolet gas analyzer. Ammonia is measured by a wet chemical method and a gas detector while $H_2$ and $O_2$ are measured by gas chromatographic techniques. The results are shown in Table I.

Remarks (Refer to Table I.)

1. As shown in Test No. 3, the $Pd-Al_2O_3$ catalyst mentioned above is packed in both reactors (1) and (2).
2. In Test No. 4, air is not introduced into the system through pipe 11 and the catalysts are the same as those of Tests (1) and (2).
3. In Test No. 5, the $Pd-Al_2O_3$ catalyst is packed in both reactors (1) and (2), and air is not introduced into the system through pipe 11.

TABLE I

| Test No. | Inlet Temperature of Catalyst Bed (°C.) | | | Space Velocity ($\times 10^4$ hr$^{-1}$) | | Oxygen (%) | | | | | Hydrogen (%) | | | | |
|---|---|---|---|---|---|---|---|---|---|---|---|---|---|---|---|
| | Reactor 1 | Reactor 2 | Reactor 3 | A | D | A | B | C | D | E | A | B | C | D | E |
| 1 | 300 | 400 | 300 | 5 – 10 | 5 – 10 | 3.2 | 2.0 | 0 | 6 – 7 | 5 – 6 | 1.2 | 0.1 | 0 | 0 | 0 |
| 2 | 250 | 300 – 400 | 250 | 5 – 10 | 5 – 10 | 3.5 | 1.5 | 0.1 | 7 – 8 | 6 – 7 | 1.2 | 0.2 | 0 | 0 | 0 |
| 3 | 300 | – | 300 | 5 – 10 | 5 – 10 | 2.9 | – | 0 | 6 – 7 | 5 – 6 | 1.2 | – | 0 | 0 | 0 |
| 4 | 300 | 300 | 250 | 5 – 10 | 5 – 10 | 0 | 0 | 0 | 6 – 7 | 5 – 6 | 1.4 | 1.2 | 1.1 | 0.8 | 0 |
| 5 | 300 | – | 250 | 5 – 10 | 5 – 10 | 0 | – | 0 | 6 – 7 | 5 – 6 | 1.4 | – | 1.2 | 1.0 | 0 |

TABLE I (Continued)

| Test No. | Hydrocarbon (ppm) | | | | | Removal Ratio of Nitrogen Oxides (%) | Removal Ratio of Carbon Monoxide (%) | Removal Ratio of Hydrocarbon (%) |
|---|---|---|---|---|---|---|---|---|
| | A | B | C | D | E | | | |
| 1 | 500 | 400 | 400 | 300 | 30 | 94.8 | 97.8 | 94.0 |
| 2 | 400 | 300 | 300 | 250 | 40 | 94.0 | 97.8 | 90.0 |
| 3 | 500 | – | 400 | 350 | 50 | 80.5 | 97.8 | 90.0 |
| 4 | 450 | 450 | 450 | 400 | 40 | 56.0 | 95.8 | 91.1 |
| 5 | 420 | – | 420 | 350 | 30 | 40.3 | 96.2 | 92.9 |

TABLE I (Continued)

| Test No. | Nitrogen Oxides (ppm) | | | | | Ammonia (ppm) | | | | | Carbon Monoxide (%) | | | | |
|---|---|---|---|---|---|---|---|---|---|---|---|---|---|---|---|
| | A | B | C | D | E | A | B | C | D | E | A | B | C | D | E |
| 1 | 1150 | 880 | 50 | 30 | 60 | 0 | 30 | 60 | 40 | 0 | 4.5 | 2.5 | 1.5 | 1.2 | 0.1 |
| 2 | 1610 | 1200 | 20 | 15 | 70 | 0 | 50 | 120 | 90 | 0 | 4.6 | 2.0 | 1.4 | 1.0 | 0.1 |
| 3 | 1540 | - | 50 | 40 | 300 | 0 | - | 600 | 500 | 0 | 4.5 | - | 3.0 | 2.5 | 0.1 |
| 4 | 1580 | 850 | 280 | 240 | 700 | 0 | 600 | 800 | 750 | 0 | 4.5 | 4.7 | 4.6 | 4.0 | 0.2 |
| 5 | 1540 | - | 540 | 450 | 920 | 0 | - | 800 | 720 | 0 | 5.3 | - | 5.3 | 4.8 | 0.2 |

C. Results:

The results shown in Table I show the effectiveness of the process of this invention in removing various components from exhaust gases. The process was especially efficient in the removal of nitrogen oxides from the gas mixture. The results also show that the removal of the nitrogen oxides is facilitated by the addition of oxygen or air to the exhaust gases. It was found that other catalysts such as a commercial Ni catalyst, a copper-chromite catalyst and a copper-palladium catalyst gave results almost the same as those for the Pd-$Al_2O_3$ cayalyst of Table I.

EXAMPLE 2

The catalysts, apparatus and procedure employed here were the same as employed in Example 1, except that honey comb type catalysts were used instead of pellet type catalysts. The results were almost the same as those of Example 1, as shown in Table I.

Having now fully described the invention, it will be apparent to one of ordinary skill in the art that many changes and modifications can be made thereto without departing from the spirit or scope of the invention as set forth herein. Accordingly,

What is claimed and intended to be covered by Letters Patent is:

1. A method for the catalytic conversion of harmful components in exhaust gases containing nitrogen oxides, carbon monoxides, hydrogen and hydrocarbons, which comprises:

charging oxygen or an oxygen containing gas into said exhaust gases in amounts sufficient to completely oxidize said hydrogen component but less than half the total quantity of oxygen needed to oxidize both the hydrogen and carbon monoxide components in said exhaust gases;

introducing said oxygen containing exhaust gases into an oxidizing catalyst bed at a temperature of 50° – 300°C sufficient to oxidize said hydrogen in the exhaust gases and to remove all of said oxygen from said exhaust gases;

introducing the exhaust gases issuing from said oxidizing catalyst bed into a nitrogen oxide reducing catalyst bed at a temperature above 300°C to reduce the nitrogen oxides present in the exhaust gases;

admixing the exhaust gases issuing from said reducing catalyst bed with additional oxygen or oxygen containing gas; and introducing said admixture into a second oxidizing catalyst bed at a temperature of 100° – 700°C to oxidize any remaining carbon monoxide and hydrocarbons in said exhaust gases.

2. The method of claim 1, wherein the heat generated in said oxidizing catalyst bed by the reaction of hydrogen and oxygen is transferred into said nitrogen oxide reducing catalyst bed.

3. The method of claim 1, wherein the catalytic material for oxidizing hydrogen in said oxidizing catalyst bed is substantially the same as that used for reducing nitrogen oxides in said nitrogen oxide reducing catalyst bed.

4. The method of claim 1, wherein a supported catalyst selected from the group consisting of copper chromite, palladium, and nickel is employed in said nitrogen oxide reducing catalyst bed.

5. The method of claim 1, wherein a supported platinum catalyst is employed in said oxidizing catalyst bed.

6. The method of claim 1, wherein at least one supported catalyst selected from the group consisting of copper chromite, platinum, palladium, and nickel is employed in said second oxidizing catalyst bed.

7. The method of claim 1 wherein from 40–70% CO conversion to $CO_2$ occurs in the oxidizing bed steps.

* * * * *